United States Patent [19]

Rackman

[11] 3,755,641

[45] Aug. 28, 1973

[54] MATING CONFIGURATIONS FOR CONNECTABLE COMPONENTS

[76] Inventor: Michael I. Rackman, 1710 Glenwood Rd., Brooklyn, N.Y.

[22] Filed: Feb. 5, 1970

[21] Appl. No.: 9,001

[52] U.S. Cl. ...................... 200/163, 274/4 B, 40/22

[51] Int. Cl. ............................................ H01h 1/38

[58] Field of Search ............... 40/2.2, 64, 86, 106.1; 35/52; 274/11, 4 B; 200/163

[56] References Cited

UNITED STATES PATENTS

| | | | |
|---|---|---|---|
| 1,286,116 | 11/1918 | Rousset | 312/319 |
| 1,666,994 | 4/1928 | Cross | 40/19.5 |
| 2,963,940 | 12/1960 | Raabe | 312/319 |

*Primary Examiner*—Robert W. Michell
*Assistant Examiner*—Wenceslad J. Contreras
*Attorney*—Gottlieb, Rackman and Reisman

[57] ABSTRACT

Cooperating mating configurations on a cartridge and a receptacle therefor. The configuration of the receptacle is such that for a cartridge to fit properly in the receptacle, it must exhibit a configuration which if used without authorization would be an infringement of legal trademark rights.

10 Claims, 6 Drawing Figures

INVENTOR.
MICHAEL I. RACKMAN
Amster & Rothstein
ATTORNEYS

MATING CONFIGURATIONS FOR CONNECTABLE COMPONENTS

This invention relates to mating configurations for connectable components, and more particularly to configurations which will prevent the mating of unauthorized components.

There are many situations in which a cartridge or some similar type of component must be mated with a receptacle or some similar type of component. A common illustration is the insertion of a tape cartridge into a tape recorder. The receptacle in the tape recorder is generally rectangular in shape and the cartridge can simply be slipped into the receptacle. As it has developed in the industry, generally speaking, no atempt is made by the tape recorder manufacturer to limit the use of his machine to cartridges of his own manufacture, nor do cartridge manufacturers make an attempt to design their cartridges so that they function with only specific machines. Instead, the tape recorder manufacturers provide machines which generally accept cartridges of all makers, and the cartridge manufacturers market cartridges which can function with the tape recorders of many different companies However, there are cases where the manufacturer of a machine might wish to limit the use of the machine with only authorized cartridges. (Although hereinafter reference is made primarily to the receptacle of a machine and a cartridge, it is to be understood that the principles of the invention are applicable to other components.) As an illustration, the manufacturer of a magnetic tape deck might wish to insure that only tape reels of his own manufacture could be used on the machine, for example, to cut down on complaints registered with the machine manufacturer when an inferior tape reel is used which results in a malfunction. For the most part, there is no effective way for a machine manufacturer to control use of cartridges and similar components in the manner described (unless the cartridges are patented). Once the machine is sold, the purchaser can buy cartridges of any other manufacturer for use in the machine.

It is a general object of my invention to provide a mating configuration for two components which will allow the manufacturer of one component to limit the use thereof to the paired components of his own manufacture or choice.

Briefly, in accordance with the principles of my invention, the mating configuration required on the cartridge for insertion into the receptacle has a physical shape in the form of an enforceable trademark, that is, a configuration which is used without authorization would be an infringement of legal trademark rights. (The trademark may be the subject of a federal or state registration, but need not be, as long as it is susceptible of protection, e.g., in a state action for unfair competition.)

For example, consider a cartridge-type playback machine which might be sold by International Business Machines Corporation, owner of the trademark IBM. (Although the IBM example is used throughout this application, it is noted that applicant has no connection with the IBM Corporation and the illustrative trademark has been selected only because it is so widely known.) Assuming that the owner of the trademark desired to limit use of its machine with cartridges of its own manufacture (or manufactured under its license), the rear face of the receptacle might have a female impression therein of a mirror-image of the trademark IBM. For a tape cartridge to fit properly within the receptacle, it would be necessary for the front of the cartridge to include the trademark IBM in raised-letter form so that the two mating configurations could engage each other and so properly orient the cartridge within the receptacle. Since any cartridge manufactured for use with the machine would require to have on it a recognized form of the trademark of the machine manufacturer, it is apparent that cartridges could be made only by the trademark owner or its licensee. Other configurations, which have the same purpose, are described below.

It is a feature of my invention to provide mating configurations on two components, for example, a cartridge and a receptacle, such that for the proper mating of the first component with the second it is necessary for the first component to exhibit a recognizable form of an enforceable trademark.

Further objects, features, and advantages of my invention will become apparent upon consideration of the following detailed description in conjunction with the drawing, in which.

Figures 1, 2, 3, 4, 5, 6:
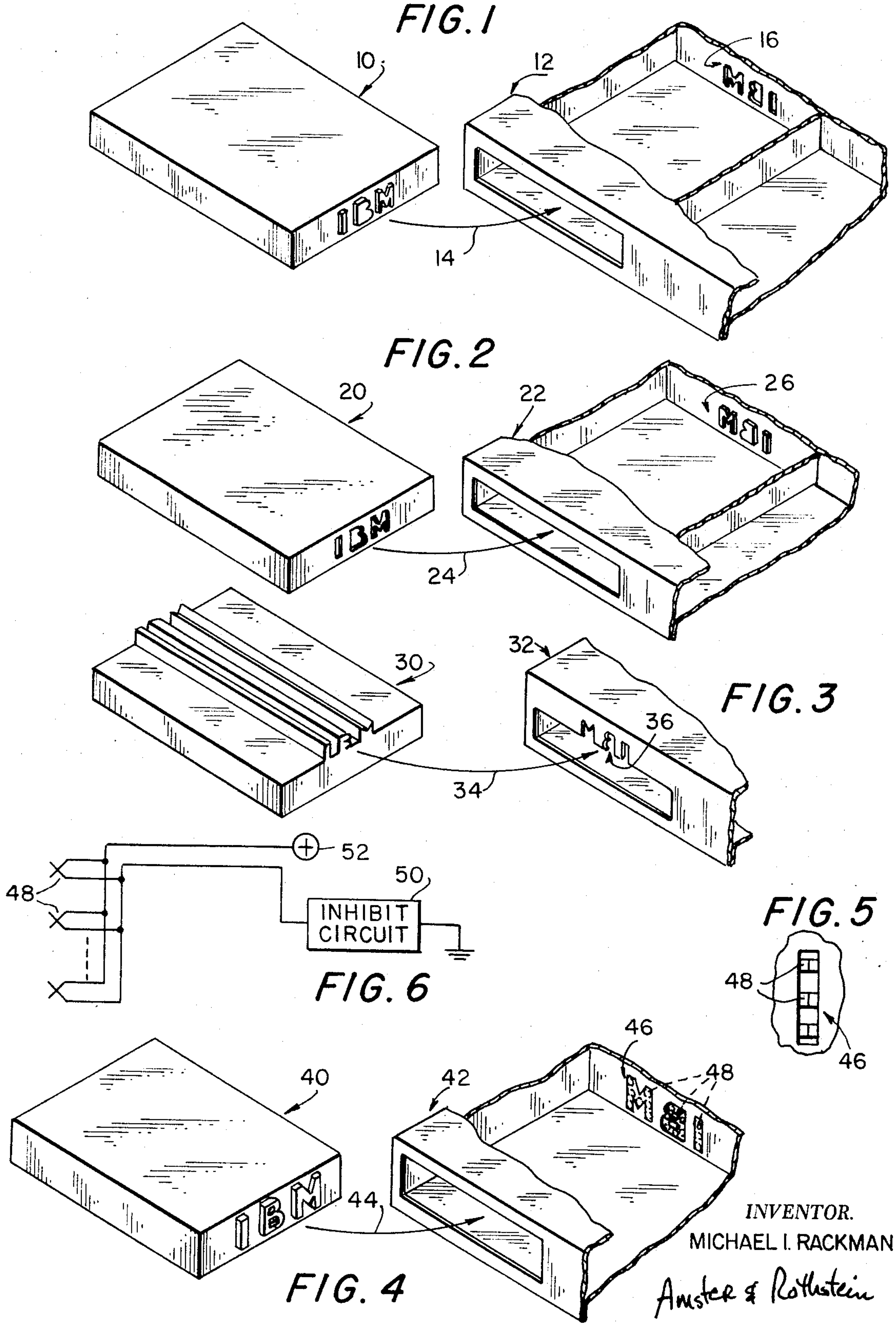
FIGS. 1–4 illustrate four illustrative embodiments of the invention.
FIG. 5 represents a detail of the embodiment of FIG. 4.
FIG. 6 represents a circuit which may be used with the embodiment of FIG. 4.

Referring to FIG. 1, a portion of a cartridge-type tape machine 12 is shown partially broken away. A cartridge 10 can be inserted into the receptacle as shown by arrow 14. On the rear face 16 of the receptacle there is an impressed mirror-image of the trademark IBM. On the forward face of the receptacle, there is included in raised letters the trademark IBM. It is apparent that when cartridge 10 is inserted into the receptacle, the male form of the trademark engages the female form.

It should be noted that in a typical tape cartridge, the magnetic tape appears at the forward face and the associated mechanical and circuit elements in the machine appear at rear face 16. However, it is possible to provide these elements on a side of the cartridge and a side of the receptacle. Similarly, it is possible to provide the trademark configurations on a side of the front face of the cartridge and the rear face of the receptacle so that they do not interfere with the tape and other elements if they are in their normal positions. These various elements are not shown in the drawing, and the various forms of the trademark are shown as they are for the sake of the greatest clarity. It is apparent that the positions of the mating trademark configurations are not controlling.

The trademark IBM is a symbol used by one manufacturer to identify and distinguish its product from those of others. It is a proprietary mark pointing distinctly to the products of one producer and cannot be used by another without authorization. Consequently, if the IBM Corporation were to market a machine having a female impression of the trademark IBM therein, the only cartridges which could be used on the machine would be those authorized by the IBM Corporation. The manufacture of a cartridge 10 without authorization would subject the seller thereof to a suit for trademark infringement. In this manner, even though the cartridge itself might not be protected by a patent, the cartridges used with a machine could still be controlled by the trademark owner.

The embodiment of the invention shown in FIG. 2 is very similar to that of FIG. 1. Again, a cartridge 20 insertable into the receptacle of a machine 22 as shown by arrow 24. But instead of using raised letters on the carridge and depressed letters on the rear face 26 of the receptacle, the reverse is shown. Here, the raised mirror-image of the trademark is included in the receptacle while the cartridge exhibits the female impression. The embodiment of FIG. 2 offers an advantage over that of FIG. 1. Assuming that in both cases the cartridge fits snugly in the receptacle, in the embodiment of FIG. 1 it might be possible for a cartridge manufacturer to market a cartridge without the raised trademark symbol. If the cartridge has a flat front face (that is, the cartridge of FIG. 1 with the letters IBM filed off), the cartridge would still fit properly in the machine receptacle. However, the cartridge 20 of FIG. 2 cannot fit properly in the receptacle without a female impression in its front face. If the front face is flat, the cartridge will not slide all the way into the receptacle as a result of the projection of the mirror-image of the trademark IBM on the rear face of the receptacle. For a cartridge to be used with the machine, it would necessarily have to be provided with a female impression on the front face thereof.

However, it is still possible for trademark infringement to be avoided by a cartridge manufacture by providing a female impression in the front face of cartridge 20 whose shape is nothing more than a rectangle which fits snugly around the raised letters on the rear face of the receptacle. Since the rectangular impression would not be an infringement of the trademark IBM, infringement could be avoided. The fit of the cartridge in the receptacle might in many cases be poorer than it is if the female impression has the form of the trademark provided on the rear face of the receptacle, but there would be no infringement.

The embodiment of the invention shown in FIG. 3 avoids this problem to a considerable degree. Cartridge 30 can be inserted into the receptacle of a machine 32 as shown by arrow 34. On the top of the cartridge, there are provided lengthwise runners having the IBM configuration. At the top of the receptacle, there is a mating female configuration of the same trademark. (Of course, for a cartridge 30 to fit into the receptacle of machine 32, it is not necessary for the runners on the cartridge to extend along the entire length of the cartridge. But even a short runner will exhibit the enforceable trademark.) It is not possible to avoid infringement by having a rectangular ridge at the top of the cartridge (comparable to an impressed rectangle on the front face of cartridge 20) because in such a case the cartridge would not fit into the receptacle.

It should be noted that it might be possible to omit the runners on the cartridge altogether, since in such a case the cartridge would still fit snugly in the receptacle just as cartridge 10 in FIG. 1 can be made without the male IBM trademark configuration. However, to avoid this situation, the receptacle in the machine 32 of FIG. 3 can be made much wider than the width of the cartridge. In such a case, without the runners on the cartridge, the cartridge would not be properly positioned within the receptacle. Of course, a much wider cartridge could be used to fit snugly in the wider receptacle, in which case the runners on the cartridge would not be required. However, the cartridge would necessarily be more costly and would be unnecessarily large.

But it still might be possible to avoid infringement even with the configuration of FIG. 3. For example, the "B" runner might be omitted, the "I" and "M" runners being sufficient for properly positioning the cartridge within the receptacle. This might avoid trademark infringement (although the fit might not be as good). For this reason, an alternative embodiment of the invention is shown in FIG. 4 which makes it very difficult to manufacture a cartridge which does not include the enforceable illustrative trademark IBM.

Cartridge 40 is similar to cartridge 10 and includes raised letters on its face. The only difference is that the B on the cartridge 40 is not a solid block as on the cartridge 10, and includes the two central holes. Cartridge 40 is inserted into the receptacle of machine 42 as shown by arrow 44. The rear face 46 of the receptacle includes a female mirror-image impression of the trademark IBM, as in the embodiment of the invention shown in FIG. 1.

However, the machine 42 further includes a plurality of pairs of contacts 48. The front view of three such pairs of contacts within the I impression is shown in FIG. 5, and the contacts are shown symbolically in FIG. 6. Each pair of contacts includes two fingers which engage each other. It is apparent that when cartridge 40 is inserted into the receptacle of the machine 42, the male I projection on the front face of the cartridge, when inserted into its female mate on rear face 46 of the receptacle, separates the two contacts in each of the three pairs. Similarly, a plurality of paired contacts are disposed around the B and M female impressions in machine 42, and the corresponding male projections on the cartridge separate the contacts in each of the pairs from each other.

As shown in FIG. 6, all of the contact pairs are connected in parallel. As long as any pair of contacts is closed, potential source 52 is connected to inhibit circuit 50. The inhibit circuit serves to prevent operation of the machine 42. Only if all of contact pairs 48 are open can the machine operation proceed. By providing a sufficient number of contact pairs, thus requiring a sufficient number of "high points" on the front face of cartridge 40, it can be insured that in order to construct a cartridge which will disable inhibit circuit 50, it will be necessary to include a sufficient number of high points on the front face of the cartridge which will necessarily infringe the trademark. For example, there are seven pairs of contacts 48 within the female M in the machine. Even if it is attempted to avoid providing a complete M on the front face of the cartridge, it will still be necessary to to provide at least seven high points or pin projections on the face of the cartridge to correspond with the contact pairs in the machine. Since these projections would still have an overall shape of the letter M, infringement would not be avoided. By providing the contact pairs in the receptacle, a male projection must be used on the front face of the cartridge. And by providing a sufficient number of contact pairs, it is necessary for the cartridge to exhibit a male projection which necessarily constitutes a trademark infringement by its close similarity to the enforceable trademark.

Other forms of mechanical or electrical interfaces are also possible. For example, a capacitive coupling technique could be used. In such a case, the front face of each male trademark projection could be coated with a conducting metal. Similarly, the rear face of each female impression in the receptacle could be similarly coated, on top of which there could be placed a dielectric material. Each coating would in effect comprise the late of a capacitor (assuming that the three coatings in the case of a three-letter trademark were electrically connected, e.g., simply by embedding wires in the cartridge and receptacle). A circuit could be provided in the machine for measuring the capacitance. Only if the capacitance exceeded a predetermined level would the machine operate. In such a case, the male projections on the face of the cartridge would have to be used in order to bring the plate of the capacitor on the cartridge close enough to the plate in the receptacle to exceed the predetermined capacitance level. And a complete coating (in the form of a full trademark) on the cartridge would be necessary to provide a sufficient plate size.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

What I claim is:

1. A cartridge-receptacle assembly comprising a receptacle included in a machine, a cartridge for insertion into said receptacle, cooperating mating means carried by said cartridge and said receptacle, said mating means including pairs of complementary indicia of three-dimensional configuration, the configuration on said cartridge indicating the source of origin thereof, receptacle circuit means for controlling the operation of said machine, and means for changing the state of said circuit means responsive to the engagement of said mating means on said cartridge and said receptacle.

2. A cartridge-receptacle assembly in accordance with claim 1 wherein said cooperating mating means includes a male member on one of said cartridge and said receptacle and a mating female member on the other of said cartridge and said receptacle.

3. A cartridge-receptacle assembly in accordance with claim 2 wherein said three-dimensional configuration is in the form of letters of the alphabet.

4. A cartridge-receptacle assembly in accordance with claim 1 wherein the mating means on one of said cartridge and said receptacle is a runner having a cross-section which if copied without authorization and used on said cartridge or said receptacle would be an infringement of legal trademark rights, and the cooperating mating means on the other of said cartridge and said receptacle is a guide for insertion therein of said runner.

5. A cartridge-receptacle assembly in accordance with claim 4 wherein said cross-section is in the form of letters of the alphabet.

6. A mechanism for preventing the mating connection of an unauthorized component to a unit to which only designated components are to be connected, said mechanism comprising connection means on said unit for enabling a component to be matingly connected to said unit only if a corresponding mating connecting means on said component has a predetermined physical configuration, said predetermined physical configuration being indicia in the form of an enforceable trademark, said connection means including means for controlling the operation of said unit, and means for changing the state of said controlling means responsive to the mating of said connecting means on said component with said connection means in said unit.

7. A mechanism in accordance with claim 6 wherein said connection and connecting means include a male member on one of said unit and said component and a mating female member on the other of said unit and said component.

8. A mechanism in accordance with claim 7 wherein said physical configuration is in the form of letters of the alphabet.

9. A mechanism in accordance with claim 6 wherein said connection and connecting means include a runner on one of said unit and said component having a cross-section which if included thereon without authorization would be an infringement of legal trademark rights, and a coooperating guide on the other of said unit and said component for insertion therein of said runner.

10. A mechanism in accordance with claim 9 wherein said cross-section is in the form of letters of the alphabet.

* * * * *